United States Patent
Tomoda et al.

(10) Patent No.: US 12,123,475 B2
(45) Date of Patent: Oct. 22, 2024

(54) CORE WIRE FOR DRIVE BELT, DRIVE BELT, AND METHOD FOR MANUFACTURING CORE WIRE AND DRIVE BELT

(71) Applicant: Mitsuboshi Belting Ltd., Kobe (JP)

(72) Inventors: Takuya Tomoda, Hyogo (JP); Yasushi Hirakawa, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 113 days.

(21) Appl. No.: 17/758,312

(22) PCT Filed: Jan. 13, 2021

(86) PCT No.: PCT/JP2021/000915
§ 371 (c)(1),
(2) Date: Jul. 1, 2022

(87) PCT Pub. No.: WO2021/145348
PCT Pub. Date: Jul. 22, 2021

(65) Prior Publication Data
US 2023/0037131 A1    Feb. 2, 2023

(30) Foreign Application Priority Data

Jan. 16, 2020    (JP) ................................. 2020-005388
Dec. 14, 2020    (JP) ................................. 2020-206743

(51) Int. Cl.
*F16G 1/10*    (2006.01)
*D02G 3/04*    (2006.01)
(Continued)

(52) U.S. Cl.
CPC ................. *F16G 1/10* (2013.01); *D02G 3/04* (2013.01); *D02G 3/28* (2013.01); *D02G 3/44* (2013.01); *F16G 1/28* (2013.01)

(58) Field of Classification Search
CPC ...... F16G 5/06; F16G 1/08; F16G 5/08; F16G 5/10; F16G 5/00; F16G 1/10; F16G 1/12;
(Continued)

(56) References Cited

U.S. PATENT DOCUMENTS 2,631,463 A * 3/1953 Waugh ...................... F16G 5/06
   474/263
2,739,090 A * 3/1956 Waugh ...................... F16G 5/06
   428/172

(Continued)

FOREIGN PATENT DOCUMENTS

CN    104919099 A    9/2015
CN    106192115 A    12/2016
(Continued)

OTHER PUBLICATIONS

Feb. 14, 2023—(CN) Notification of First Office Action—CN App 202180008880.5, Eng Tran.

(Continued)

*Primary Examiner* — Henry Y Liu
(74) *Attorney, Agent, or Firm* — Banner & Witcoff, Ltd.

(57) ABSTRACT

A core wire for a power-transmission belt includes a plied twisted cord formed by putting together and secondary twisting a plurality of primary twisted yarns. The primary twisted yarns include a plurality of hard primary twisted yarns (A) and one soft primary twisted yarn (B). The hard primary twisted yarns (A) include an aramid fiber, and a fineness of each hard primary twisted yarn (A) is 1500 dtex or less. The soft primary twisted yarn (B) includes a low elastic modulus fiber. A ratio (B/A) of a primary twist coefficient of the soft primary twisted yarn (B) to an average value of primary twist coefficients of the hard primary twisted yarns (A) is 0.5 to 1.2.

12 Claims, 3 Drawing Sheets

(51) Int. Cl.
*D02G 3/28* (2006.01)
*D02G 3/44* (2006.01)
*F16G 1/28* (2006.01)

(58) Field of Classification Search
CPC .... F16G 1/00; F16G 5/04; F16G 1/06; D02G 3/04; D02G 3/28; D02G 3/44
USPC ......................................................... 474/260
See application file for complete search history.

(56) References Cited

U.S. PATENT DOCUMENTS

| | | | | | |
|---|---|---|---|---|---|
| 3,473,400 | A * | 10/1969 | Garbin | | F16G 5/06 |
| | | | | | 474/263 |
| 3,981,206 | A * | 9/1976 | Miranti, Jr. | | F16G 5/20 |
| | | | | | 474/271 |
| 3,992,959 | A * | 11/1976 | Cicognani | | F16G 5/08 |
| | | | | | 474/260 |
| 4,522,869 | A * | 6/1985 | Anderson, Jr. | | D06N 3/0054 |
| | | | | | 156/137 |
| 4,642,082 | A * | 2/1987 | Mashimo | | F16G 5/06 |
| | | | | | 474/260 |
| 5,037,360 | A * | 8/1991 | Fujiwara | | F16G 5/20 |
| | | | | | 474/260 |
| 5,224,905 | A * | 7/1993 | Mishima | | F16G 5/20 |
| | | | | | 474/271 |
| 5,254,050 | A * | 10/1993 | Nakajima | | F16G 5/06 |
| | | | | | 474/271 |
| 5,284,456 | A * | 2/1994 | Connell | | F16G 5/20 |
| | | | | | 474/260 |
| 5,387,160 | A * | 2/1995 | Nakajima | | C08K 5/39 |
| | | | | | 474/271 |
| 5,417,619 | A * | 5/1995 | Tajima | | F16G 5/20 |
| | | | | | 474/260 |
| 5,501,908 | A * | 3/1996 | Shioyama | | F16G 5/20 |
| | | | | | 474/263 |
| 5,531,650 | A * | 7/1996 | Azuma | | F16G 1/28 |
| | | | | | 474/260 |
| 5,711,734 | A * | 1/1998 | Shioyama | | C08L 23/34 |
| | | | | | 474/271 |
| 5,746,674 | A * | 5/1998 | Tajima | | F16G 5/20 |
| | | | | | 474/260 |
| 5,792,018 | A * | 8/1998 | Winninger | | F16G 1/08 |
| | | | | | 474/260 |
| 6,033,331 | A * | 3/2000 | Winninger | | F16G 5/20 |
| | | | | | 474/263 |
| 6,056,656 | A * | 5/2000 | Kitano | | F16G 5/20 |
| | | | | | 474/260 |
| 6,132,328 | A * | 10/2000 | Kinoshita | | F16G 5/20 |
| | | | | | 474/260 |
| 6,176,799 | B1 * | 1/2001 | Kinoshita | | F16G 5/20 |
| | | | | | 474/260 |
| 6,238,314 | B1 * | 5/2001 | Tajima | | F16G 5/06 |
| | | | | | 474/260 |
| 6,287,230 | B1 * | 9/2001 | Okuno | | C08K 3/26 |
| | | | | | 474/260 |
| 6,336,885 | B1 * | 1/2002 | Hayashi | | B29D 29/103 |
| | | | | | 474/263 |
| 6,358,609 | B2 * | 3/2002 | Kinoshita | | F16G 5/06 |
| | | | | | 428/167 |
| 6,409,621 | B1 * | 6/2002 | Billups | | F16G 1/28 |
| | | | | | 474/263 |
| 6,422,963 | B2 * | 7/2002 | Kurose | | F16H 7/1218 |
| | | | | | 474/260 |
| 6,443,866 | B1 * | 9/2002 | Billups | | F16G 1/28 |
| | | | | | 474/263 |
| 6,461,264 | B1 * | 10/2002 | Lofgren | | F16G 5/06 |
| | | | | | 474/263 |
| 6,491,598 | B1 * | 12/2002 | Rosenboom | | B32B 25/10 |
| | | | | | 474/263 |
| 6,595,883 | B1 * | 7/2003 | Breed | | F16G 5/06 |
| | | | | | 156/137 |
| 6,669,592 | B2 * | 12/2003 | Hayashi | | F16G 5/00 |
| | | | | | 474/260 |
| 6,758,779 | B2 * | 7/2004 | Fujimoto | | C08L 23/16 |
| | | | | | 474/263 |
| 6,875,144 | B2 * | 4/2005 | Kinoshita | | B29C 70/50 |
| | | | | | 474/263 |
| 7,485,060 | B2 * | 2/2009 | Hineno | | C08L 21/00 |
| | | | | | 474/263 |
| 7,682,274 | B2 * | 3/2010 | Akiyama | | F16G 1/28 |
| | | | | | 428/377 |
| 8,974,336 | B2 * | 3/2015 | Nakashima | | F16G 1/10 |
| | | | | | 428/221 |
| 11,796,035 | B2 * | 10/2023 | Yokoyama | | D02G 1/18 |
| 2001/0034282 | A1 * | 10/2001 | Hasaka | | F16G 5/20 |
| | | | | | 474/263 |
| 2001/0044353 | A1 * | 11/2001 | Nosaka | | B44C 1/228 |
| | | | | | 474/251 |
| 2002/0032091 | A1 * | 3/2002 | Okuno | | C08L 23/16 |
| | | | | | 474/263 |
| 2002/0039947 | A1 * | 4/2002 | Hasaka | | F16G 5/06 |
| | | | | | 474/263 |
| 2002/0072445 | A1 * | 6/2002 | Daugherty | | F16G 5/20 |
| | | | | | 474/263 |
| 2002/0094897 | A1 * | 7/2002 | Love | | F16G 5/20 |
| | | | | | 474/263 |
| 2002/0098935 | A1 * | 7/2002 | Danhauer | | F16G 5/20 |
| | | | | | 474/263 |
| 2002/0165058 | A1 * | 11/2002 | Swope | | F16G 5/20 |
| | | | | | 474/263 |
| 2002/0183153 | A1 * | 12/2002 | Patterson | | F16G 5/20 |
| | | | | | 474/263 |
| 2002/0193196 | A1 * | 12/2002 | Tani | | F16G 5/20 |
| | | | | | 474/263 |
| 2003/0017900 | A1 * | 1/2003 | Kopang | | B29D 29/00 |
| | | | | | 474/263 |
| 2003/0032514 | A1 * | 2/2003 | Edwards | | F16G 5/20 |
| | | | | | 474/263 |
| 2003/0050143 | A1 * | 3/2003 | Gregg | | F16G 1/08 |
| | | | | | 474/263 |
| 2003/0050144 | A1 * | 3/2003 | Moncrief | | F16G 5/06 |
| | | | | | 474/263 |
| 2003/0073533 | A1 * | 4/2003 | Knutson | | F16G 5/08 |
| | | | | | 474/263 |
| 2003/0139242 | A1 * | 7/2003 | Teves | | F16G 5/06 |
| | | | | | 474/263 |
| 2003/0203781 | A1 * | 10/2003 | Welk | | F16G 5/20 |
| | | | | | 474/263 |
| 2003/0211911 | A1 * | 11/2003 | Welk | | F16G 5/08 |
| | | | | | 474/263 |
| 2004/0009839 | A1 * | 1/2004 | Edwards | | F16G 5/20 |
| | | | | | 474/263 |
| 2004/0018906 | A1 * | 1/2004 | Sedlacek | | F16G 1/28 |
| | | | | | 474/260 |
| 2004/0033857 | A1 * | 2/2004 | Welk | | F16G 5/20 |
| | | | | | 474/263 |
| 2004/0048708 | A1 * | 3/2004 | Nonnast | | F16G 5/20 |
| | | | | | 474/260 |
| 2004/0058767 | A1 * | 3/2004 | Hara | | F16G 5/20 |
| | | | | | 474/263 |
| 2004/0214676 | A1 * | 10/2004 | Shiriike | | F16G 5/20 |
| | | | | | 474/263 |
| 2005/0119082 | A1 * | 6/2005 | Lofgren | | D06M 15/41 |
| | | | | | 156/137 |
| 2005/0143209 | A1 * | 6/2005 | Shibutani | | F16G 5/20 |
| | | | | | 474/260 |
| 2006/0154770 | A1 * | 7/2006 | Takaba | | F16G 5/20 |
| | | | | | 474/263 |
| 2007/0060431 | A1 * | 3/2007 | Hineno | | F16G 5/06 |
| | | | | | 474/263 |
| 2007/0249450 | A1 * | 10/2007 | Shiriike | | F16G 5/20 |
| | | | | | 474/260 |
| 2007/0249451 | A1 * | 10/2007 | Wu | | F16G 1/28 |
| | | | | | 474/263 |
| 2007/0249452 | A1 * | 10/2007 | South | | F16G 5/20 |
| | | | | | 474/263 |

(56) References Cited

U.S. PATENT DOCUMENTS

| | | | |
|---|---|---|---|
| 2007/0259746 A1* | 11/2007 | Wu | F16G 1/28 |
| | | | 474/260 |
| 2009/0075770 A1* | 3/2009 | Yoshida | F16G 1/28 |
| | | | 474/260 |
| 2010/0167860 A1* | 7/2010 | Mori | D03D 15/49 |
| | | | 474/252 |
| 2010/0263781 A1 | 10/2010 | Yamaguchi | |
| 2010/0323835 A1* | 12/2010 | Furukawa | C08L 23/16 |
| | | | 474/260 |
| 2011/0218069 A1* | 9/2011 | Nakashima | F16G 5/06 |
| | | | 474/260 |
| 2011/0269588 A1* | 11/2011 | Fleck | F16G 1/10 |
| | | | 474/260 |
| 2012/0115658 A1* | 5/2012 | Kanzow | D02G 3/447 |
| | | | 474/260 |
| 2014/0073468 A1* | 3/2014 | Knutson | D02G 3/44 |
| | | | 57/17 |
| 2015/0292124 A1 | 10/2015 | Lee et al. | |
| 2015/0369335 A1* | 12/2015 | Ishiguro | C08L 23/16 |
| | | | 474/260 |
| 2016/0010722 A1* | 1/2016 | Kim | F16G 5/08 |
| | | | 474/271 |
| 2017/0045116 A1 | 2/2017 | Kobayashi | |
| 2019/0145493 A1* | 5/2019 | Doisneau | C09J 7/29 |
| | | | 474/260 |
| 2019/0219134 A1* | 7/2019 | Kunihiro | C08L 23/08 |
| 2019/0276954 A1* | 9/2019 | Tomoda | F16G 1/28 |
| 2019/0359810 A1* | 11/2019 | Xu | C08K 5/0025 |
| 2020/0009813 A1* | 1/2020 | Tamura | B32B 5/26 |
| 2021/0190176 A1 | 6/2021 | Yokoyama et al. | |

FOREIGN PATENT DOCUMENTS

| | | |
|---|---|---|
| CN | 108625013 A | 10/2018 |
| JP | 2003-194152 A | 7/2003 |
| JP | 2005-256961 A | 9/2005 |
| JP | 2008-100365 A | 5/2008 |
| JP | 2016-506453 A | 3/2016 |
| JP | 2018-071035 A | 5/2018 |
| JP | 2019-007618 A | 1/2019 |
| JP | 2019-157298 A | 9/2019 |
| WO | 2009-063913 A1 | 5/2009 |
| WO | 2015-193934 A1 | 12/2015 |
| WO | 2018-235755 A1 | 12/2018 |

OTHER PUBLICATIONS

Apr. 14, 2021—(JP) Description of Circumstances for Accelerated Examination—App 2020-206743.

Jun. 8, 2021—(JP) Notification of Reasons for Refusal—App 2020-206743.

Mar. 30, 2021—International Search Report—Intl App PCT/JP2021/000915.

Feb. 29, 2024—(EP) Extended EP Search Report—EP App 21741692.4.

* cited by examiner

Front side  
Traveling direction of twisted cord  
Rear side

CORE WIRE FOR DRIVE BELT, DRIVE BELT, AND METHOD FOR MANUFACTURING CORE WIRE AND DRIVE BELT

CROSS REFERENCE TO RELATED APPLICATIONS

This is a U.S. National Phase Application under 35 U.S.C. § 371 of International Application No. PCT/JP2021/000915, filed Jan. 13, 2021, which claims priority to Japanese Application Nos. 2020-005388, filed Jan. 16, 2020, and 2020-206743, filed Dec. 14, 2020, which were published Under PCT Article 21(2), the entire contents of which are incorporated herein by reference.

TECHNICAL FIELD

The present invention relates to a core wire for a power-transmission belt, a power-transmission belt, and a method for producing the core wire for a power-transmission belt and the power-transmission belt.

BACKGROUND ART

As means for power transmission, belt power transmission using a power-transmission belt such as a flat belt, a V-belt, a V-ribbed belt, or a toothed belt is widely used. One of the performances required for the power-transmission belt is small elongation. When the elongation of the power-transmission belt is large, the tension of the belt decreases, and slipping or jumping is likely to occur. When the slipping or jumping occurs, the power transmission is not performed normally, and the durability of the power-transmission belt decreases. In the V-ribbed belt for driving an auxiliary machine of an automobile, an auto-tensioner having a function of absorbing the elongation of the belt to keep the tension constant may be used. However, even in this case, when the elongation of the belt is too large, the auto-tensioner cannot fully absorb the elongation of the belt, and the tension of the belt decreases. Therefore, in order to reduce the elongation of the power-transmission belt, various twisted cords that include aramid fibers having high tensile strength and high tensile elastic modulus have been proposed.

For example, Patent Literature 1 discloses a plied twisted cord having a total fineness of 4000 to 5000 dtex and obtained by secondary twisting four primary twisted yarns, each of which is formed by primary twisting para-aramid fibers having a fineness of 1000 to 1250 dtex at a twist coefficient of 1200 to 1350, at a twist coefficient of 900 to 1100 in a direction opposite to that of primary twisting. In addition, Patent Literature 2 discloses a plied twisted cord obtained by secondary twisting three primary twisted yarns, each of which is formed by primary twisting para-aramid fibers having an average fineness of 1000 to 1250 dtex, a tensile elastic modulus of 55 to 70 GPa, and a tensile strength of 2800 to 3500 MPa at a primary twist number of 33 to 40 times/10 cm, at a twist coefficient of 0.25 to 1 times a primary twist coefficient in a direction opposite to that of the primary twisting.

Meanwhile, several studies have been made on a technique of mixing and twisting aramid fibers and other fibers. For example, Patent Literature 3 discloses a twisted cord obtained by mixing and twisting high elongation aramid fibers having a tensile elastic modulus of 50 to 100 GPa and low-modulus fibers. In this document, as an effect of the invention, it is described that disturbance of the pitch and damage of the core wire can be prevented at the time of manufacturing by a mold forming method, and sound generation resistance and durability can also be maintained even when used for applications with high dynamic tension. Patent Literature 4 discloses a rubber reinforcing cord which is obtained by mixing and twisting high elastic modulus fibers and low elastic modulus fibers at a weight ratio of 65:35 to 95:5 and of which a relationship between load and elongation is within a specific range. It is described that, by twisting the high elastic modulus fibers and the low elastic modulus fibers at a specific ratio in this manner, a composite cord exhibiting a low elastic modulus in a low-elongation region and a high elastic modulus in a high-elongation region can be obtained, and the moldability of the rubber composition by elongation during molding processing and the rigidity when the rubber molded article is used thereafter can be simultaneously satisfied.

CITATION LIST

Patent Literature

Patent Literature 1: WO 2015/193934
Patent Literature 2: JP-A-2018-71035
Patent Literature 3: JP-A-2019-7618
Patent Literature 4: JP-A-2019-157298

SUMMARY OF INVENTION

Technical Problem

However, the plied twisted cords disclosed in Patent Literature 1 and Patent Literature 2 achieve both tensile strength and bending fatigue resistance by optimizing the balance between primary twisting and secondary twisting, applying high elongation aramid fibers, and the like, but durability and reliability for engines equipped with an integrated starter generator (ISG), which has been increasing in recent years, was still insufficient. In particular, in the case where the twisted cord is formed only of aramid fibers, it is difficult to sufficiently enhance the bending fatigue resistance even when the elongation of the power-transmission belt can be prevented.

Meanwhile, the composite cords disclosed in Patent Literature 3 and Patent Literature 4 are optimized for applications in which elongation of cords is required during molding, such as tires and power-transmission belts manufactured by a mold forming method. In other words, the technical concept is to increase the elongation of the cord at the time of molding the tire or the power-transmission belt by mixing the low elastic modulus fibers with the aramid fibers. Therefore, the composite cord is not suitable for a power-transmission belt manufactured by a grinding method that does not include a step of stretching a cord during molding. This is because the cord that is not stretched during the molding process has a large elongation during use of the power-transmission belt and increases the decrease in tension.

Accordingly, an object of the present invention is to provide a core wire for a power-transmission belt and a power-transmission belt which have high tensile strength and can achieve both small elongation and high bending fatigue resistance, and a method for producing the core wire for a power-transmission belt and the power-transmission belt.

Solution to Problem

As a result of intensive studies to achieve the above object, the present inventors have found that, a core wire for a power-transmission belt is formed with a plied twisted cord obtained by putting together and secondary twisting a plurality of hard primary twisted yarns (A) containing an aramid fiber having a fineness of 1500 dtex or less and one soft primary twisted yarn (B) containing a low elastic modulus fiber, and a ratio (B/A) of a primary twist coefficient of the soft primary twisted yarn (B) to an average value of primary twist coefficients of the hard primary twisted yarns (A) is adjusted to 0.5 to 1.2, whereby a core wire for a power-transmission belt and a power-transmission belt which have high tensile strength and can achieve both small elongation and high bending fatigue resistance can be provided, and have completed the present invention.

That is, the core wire for a power-transmission belt according to the present invention is a core wire for a power-transmission belt, including a plied twisted cord formed by putting together and secondary twisting a plurality of primary twisted yarns, in which the primary twisted yarns include a plurality of hard primary twisted yarns (A) and one soft primary twisted yarn (B), the hard primary twisted yarns (A) include an aramid fiber, fineness of each hard primary twisted yarn (A) is 1500 dtex or less, the soft primary twisted yarn (B) includes a low elastic modulus fiber, and a ratio (B/A) of a primary twist coefficient of the soil primary twisted yarn (B) to an average value of primary twist coefficients of the hard primary twisted yarns (A) is 0.5 to 1.2.

The fineness of the hard primary twisted yarns (A) may be 1000 dtex to 1250 dtex. The number of the hard primary twisted yarns (A) may be 3 to 4. The primary twist coefficient of the soft primary twisted yarn (B) may be 2.5 to 5, The soft primary twisted yarn (B) may contain a polyester fiber. A fineness of the soft primary twisted yarn (B) may be 900 dtex to 1250 dtex. The aramid fiber may be a high-elongation aramid fiber. When the plied twisted cord is untwisted by 100 mm and the primary twisted yarns are aligned, a difference (B−A) between a length of the soft primary twisted yarn (B) and an average length of the hard primary twisted yarns (A) may satisfy: the length of the soft primary twisted yarn (B)—the average length of the hard primary twisted yarn (A)=−1 mm to 2 mm.

The present invention also includes a method for manufacturing a core wire for a power-transmission belt. The method includes a twisting step of putting together and secondary twisting a plurality of primary twisted yarns to prepare a plied twisted cord, and a heat-stretching treatment step of applying tension to the plied twisted cord obtained in the twisting step while heating. In the heat-stretching treatment step, a heating temperature may be 160° C. to 240° C. The tension may be 0.3 cN/dtex to 1.5 cN/dtex.

The present invention also includes a power-transmission belt including the core wire for a power-transmission belt. The power-transmission belt may be a belt obtained by forming by a grinding method. The power-transmission belt may be a V-ribbed belt.

The present invention also includes a method for producing a power-transmission belt. The method includes a grinding step of forming a power-transmission belt by a grinding method.

Advantageous Effects of Invention

In the present invention, the core wire for a power-transmission belt is formed with a plied twisted cord obtained by putting together and secondary twisting a plurality of hard primary twisted yarns (A) containing an aramid fiber and one soft primary twisted yarn (B) containing a low elastic modulus fiber, and a ratio (B/A) of a primary twist coefficient of the soft primary twisted yarn (B) to an average value of primary twist coefficients of the hard primary twisted yarns (A) is adjusted to 0.5 to 1.2, so that it is possible to improve the tensile strength of the core wire for a power-transmission belt and the power-transmission belt, and it is possible to achieve both small elongation and high bending fatigue resistance. For example, when the core wire is used as a core wire for a power-transmission belt such as a V-ribbed belt, slipping or rib displacement (a phenomenon in which a rib portion of a V-ribbed belt climbs over a groove of a pulley) and pop-out (a phenomenon in which a core wire is popped out from a side surface of a power-transmission belt) can be prevented while maintaining normal power transmission, and bending fatigue resistance can also be improved.

DESCRIPTION OF EMBODIMENTS

[Core Wire for Power-transmission Belt]

Figure 1A:
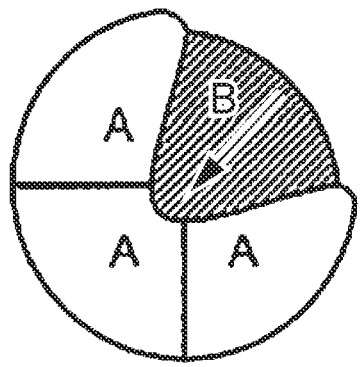
FIG. 1A is a schematic view showing a cross-sectional form of a twisted cord according to the present embodiment before a heat-stretching treatment step.

A core wire according to the present embodiment is used as a core wire for a power-transmission belt, and includes a plied twisted cord formed by putting together and secondary twisting a plurality of primary twisted yarns. The plied twisted cord includes a plurality of hard primary twisted yarns (A) containing an aramid fiber having a fineness of 1500 dtex or less and one soft primary twisted yarn (B) containing a low elastic modulus fiber. In the case where the primary twisted yarn includes only the aramid fiber, the bending fatigue resistance is insufficient, and the durability of the power-transmission belt decreases. Meanwhile, in the case where the primary twisted yarn includes only the low elastic modulus fiber, the elongation of the power-transmission belt increases.

(Hard Primary Twisted Yarn (A))

The hard primary twisted yarn (A) is an aramid multifilament yarn containing a plurality of aramid fibers. The aramid multifilament yarn may contain other fibers (such as polyester fibers) as necessary. A proportion of the aramid fiber may be 50 mass % or more (particularly 80 to 100 mass %) with respect to the total multifilament yarn. Usually, all the filaments are composed of the aramid fiber. When the proportion of the aramid fiber is too small, elongation may increase.

The aramid multifilament yarn may contain a plurality of aramid filaments, and may contain, for example, about 100 to 5000 filaments, preferably about 300 to 2000 filaments, and more preferably about 600 to 1000 filaments. An average fineness of the aramid filaments may be, for example, about 0.8 to 10 dtex, preferably about 0.8 to 5 dtex, and more preferably about 1.1 to 1.7 dtex.

The aramid fiber may be a para-aramid fiber that is a single repeating unit (e.g., "Twaron (registered trademark)" manufactured by Teijin Ltd., which is a polyparaphenylene terephthalamide fiber, or "Kevlar" manufactured by DU Pont-Toray Co., Ltd.), or may be a copolymerized para-aramid fiber containing a plurality of repeating units (e.g., "Technola" manufactured by Teijin Ltd., which is a copolymerized aramid fiber of polyparaphenylene terephthalamide and 3,4'-oxydiphenyeneerephthalamide).

The aramid fiber may have an intermediate elongation of 0.3% or more (e.g., 0.3 to 3%), preferably 0.5% or more (e.g., 0.5 to 2%), more preferably 0.6% or more (e.g., 0.6 to 1.5%), and still more preferably 0.8% or more (e.g., 0.8 to 1.3%) at a load of 4 cN/dtex. When the intermediate elongation of the aramid fiber is too low, the bending fatigue resistance may be insufficient and the durability may decrease.

In the present application, the intermediate elongation means an intermediate elongation at a load of 4 cN/dtex, and can be measured by a method in accordance with JIS L1017 (2002).

A tensile elastic modulus of the aramid fiber can be selected from a range of about 50 to 100 GPa, and is, for example, 50 to 90 GPa, preferably 60 to 90 GPa (e.g., 70 to 90 GPa), and more preferably 60 to 80 GPa (particularly 60 to 70 GPa). In an application in which high bending fatigue resistance is required, the aramid fiber may be a high-elongation aramid fiber having a tensile elastic modulus of about 50 to 70 GPa. When the tensile elastic modulus is too small, the elongation may increase. Conversely, when the tensile elastic modulus is too large, the bending fatigue resistance may decrease.

In the present application, the tensile elastic modulus can be measured by a method of measuring a load-elongation curve by a method described in JIS L1013 (2010) and determining an average inclination in a region under a load of 1000 MPa or less.

Examples of commercially available products of the aramid fiber include a standard type (Kevlar 29 manufactured by Du Pont-Torav Co., Ltd., Twaron 1014 manufactured by Teijin Ltd.) and a high elongation type Kevlar 119 manufactured by Du Pont-Toray Co., Ltd., Twaron 2100 manufactured by Teijin Ltd.). When high bending fatigue resistance is required, a high elongation type is preferably used. When stable productivity is required, a standard type is preferably used.

The fineness of each hard primary twisted yarn (A) is 1500 dtex or less, preferably 500 to 1500 dtex, more preferably 800 to 1300 dtex, still more preferably 1000 to 1250 dtex, and most preferably 1050 to 1200 dtex. When the fineness is too small, the elongation increases, the tensile strength and tensile elastic modulus decrease, and economic efficiency may also decrease. Conversely, when the fineness is too large, the bending fatigue resistance decreases and core wire pop-out is more likely to occur.

The number of the hard primary twisted yarns (A) may be plural, but is preferably 2 to 6, more preferably 2 to 4, and still more preferably 3 to 4 (particularly 3). When the number is too large, the bending fatigue resistance may decrease.

The average value of the primary twist coefficient of the hard primary twisted yarns (A) can be selected from a range of about 1 to 8, and may be, for example, 2 to 6, preferably 2.5 to 5.5, more preferably 3 to 5, and still more preferably 3.5 to 5 (particularly 4 to 5). When the average value of the primary twist coefficient is too small, the bending fatigue resistance may decrease. Conversely, When the average value is too large, the tensile strength and the tensile elastic modulus may decrease.

In the present application, each twist coefficient of the primary twist coefficient and the secondary twist coefficient can be calculated based on the following equation.

$$\text{Twist coefficient} = [\text{the number of twists(twists}/m) \times \sqrt{\text{total fineness}(tex)}]/960$$

(Soft Primary Twisted Yarn (B))

The soft primary twisted yarn (B) is a low elastic modulus multifilament yarn including a plurality of low elastic modulus fibers. The low elastic modulus multifilament yarn may contain other fibers (high elastic modulus fibers and the like) as necessary. A proportion of the low elastic modulus fibers may be 50 mass % or more (particularly 80 to 100 mass %) with respect to the total multifilament yarns, and usually all the filaments are composed of the low elastic modulus fibers.

The low elastic modulus multifilament yarn may include a plurality of low elastic modulus filaments, and may include, for example, about 100 to 5000, preferably about 120 to 1000, and more preferably about 300 to 400 low elastic modulus filaments. An average fineness of the low elastic modulus filaments may be, for example, about 0.8 to 10 dtex, preferably about 1 to 8 dtex, and more preferably about 2 to 4 dtex.

Examples of the low elastic modulus fiber include a natural fiber (cotton, hemp, etc.), a regenerated fiber (rayon, acetate, etc.), a synthetic fiber (a polyolefin fiber such as polyethylene and polypropylene, a styrene-based fiber such as polystyrene, a fluorine-based fiber such as polytetrafluoroethylene, an acrylic-based fiber, a polyvinyl chloride fiber, a polyvinylidene chloride fiber, a vinylon fiber, a vinyl alcohol-based fiber such as polyvinyl alcohol, a polyamide fiber, a polyester fiber, a polyurethane fiber, etc.). These fibers may be used alone or in combination of two or more kinds.

Among these fibers, a polyester fiber and an aliphatic polyamide fiber are preferable in terms of economic efficiency, mechanical properties, heat resistance, and the like. Among these, a polyester fiber having $C_{2-4}$ alkylene-allylate as a main constituent unit such as ethylene terephthalate and ethylene-2,6-naphthalate [a polyalkylene allylate-based fiber such as a polyethylene terephthalate-based fiber (PET fiber), a polyethylene naphthalate-based fiber (PEN fiber), and a polytrimethylene terephthalate fibers (PTT fiber)] and a aliphatic polyamide fiber (a polyamide 6 fiber, a polyamide 46 fiber, a polyamide 66 fiber, a polyamide 612 fiber, and a polyamide 12 fiber) are preferable, a polyalkylene allylate fiber and an aliphatic polyamide fiber such as a polyamide 66 fiber is more preferable, and a poly $C_{2-4}$ alkylene-$C_{6-10}$ allylate fiber such as a PET fiber is most preferable from the viewpoint of achieving both bending fatigue resistance and small belt elongation.

The PET fiber can be selected from commercially available standard type, low shrinkage type, high modulus low shrinkage type, and the like. Among these, a high-modulus low-shrinkage type, which can reduce the elongation of the belt and is excellent in dimensional stability, is preferable. Examples of the commercially available product include Tetron (1100T-240-704M, 1100T-240-705M, and 1100T-360-704M) manufactured by foray Industries, Inc.

The low elastic modulus fiber may have a tensile elastic modulus of 20 GPa or less, for example, 2 to 18 GPa, preferably 4 to 15 GPa, and more preferably 8 to 12 GPa. When the tensile elastic modulus is too small, the elongation may increase. Conversely, when the tensile elastic modulus is too large, the bending fatigue resistance may decrease.

The fineness of the soft primary twisted yarn (B) may be 1500 dtex or less, preferably 500 to 1500 dtex, more preferably 800 to 1300 dtex, still more preferably 900 to 1250 dtex, and most preferably 1000 to 1200 dtex. In particular, by adjusting the fineness of the soft twisted yarn (B) formed of the polyester fibers within these ranges (in particular, 900 to 1250 dtex), the tensile strength and the bending fatigue resistance can be improved without increasing the belt elongation too much. When the fineness is too small, the bending fatigue resistance may not be sufficiently improved. Conversely, when the fineness is too large, the elongation of the power-transmission belt may increase.

The primary twist coefficient of the soft primary twisted yarn (B) can be selected from a range of about 1 to 7, and may be, for example, 2 to 6, preferably 2.5 to 5, more preferably 3 to 5, and still more preferably 3.5 to 5 (particularly 4 to 5). When the primary twist coefficient is too small, the elongation of the power-transmission belt may increase. Conversely, when the primary twist coefficient is too large, the bending fatigue resistance may decrease. A mechanism, in which the lower the primary twist coefficient is and the smaller the twist is, the larger the elongation is, is a mechanism that cannot be easily predicted by a common mechanism, and is an unexpected mechanism expressed by being combined with specific hard primary twisted yarns (A) as described later.

(Characteristics of Plied Twisted Cord)

The plied twisted cord is obtained in the following manner. A primary twisted yarn including a plurality of hard primary twisted yarns (A) and one soft primary twisted yarn (B) is put together and secondary twisted in a direction opposite to a direction of the primary twisting to obtain a plied twisted yarn (plied twisted cord). In the case of a Lang's lay twisted cord in which a direction of the primary twisting and a direction of the secondary twisting are the same, a loop or a kink (shape displacement) is easily formed, and the handleability is poor since the twisted cord itself has a large twisting property (untwisting torque). Meanwhile, in the case of a plied twisted cord in which the secondary twisting is applied in a direction opposite to the direction of the primary twisting, the formation of a loop or a kink is reduced, and the handleability is excellent since the untwisting torque is canceled by the primary twisting and the secondary twisting. Further, when the plied twisted cord having small untwisting torque is used as the core wire for a power-transmission belt, the straightness of the power-transmission belt is improved, and the occurrence of rib displacement and pop-out can be prevented.

The plied twisted cord may further include other primary twisted yarns in addition to the hard primary twisted yarns (A) and the soft primary twisted yarn (B). Examples of other primary twisted yarns include a hard primary twisted yarn containing a wholly aromatic polyester fiber, a hard primary twisted yarn containing a polyparaphenylene benzobisoxazole (PBO) fiber, a hard primary twisted yarn containing an inorganic fiber such as a carbon fiber and a glass fiber, and a soft primary twisted yarn shown as the soft primary twisted yarn (B), The number of other primary twisted yarns may be, for example, 3 or less, preferably 0 to 2, and more preferably 0 or 1.

The total proportion of the hard primary twisted yarns (A) and the soft primary twisted yarn (B) may be 50 mass % or more, preferably 80 mass % or more, more preferably 90 mass % or more, and still more preferably 100 mass % with respect to the entire plied twisted cord.

In the present embodiment, the ratio (B/A) of the primary twist coefficient of the soft primary twisted yarn (B) to the average value of the primary twist coefficients of the hard primary twisted yarns (A) is 0.5 to 1.2. In the present embodiment, by adjusting the ratio (B/A) of the primary twist coefficient to the above range, it is possible to improve the balance between the hard primary twisted yarns (A) and the soft primary twisted yarn (B) in the plied twisted cord (secondary twisted yarn), and it is possible to achieve both small elongation and bending fatigue resistance. When the ratio (B/A) of the primary twist coefficient is less than 0.5, the degree of freedom in the cross-sectional shape of the soft primary twisted yarn (B) in the plied twisted cord increases (that is, the convergence decreases due to the loose twist and the cross-sectional shape becomes non-uniform), and as a result, the elongation of the power-transmission belt increases. When the ratio (B A) of the primary twist coefficient exceeds 1.2, the elongation of the primary twisted yarn (B) increases, and the primary twisted yarn (B) is moved to the periphery of the plied twisted cord (a state in FIG. 1C described later), and as a result, the bending fatigue resistance is not sufficiently improved.

The ratio (B/A) of the primary twist coefficient is preferably 0.6 to 1.2, more preferably 0.7 to 1.15, still more preferably 0.8 to 1.1, and most preferably 0.9 to 1.05.

The secondary twist coefficient of the plied twisted cord is preferably 2 to 4. When the secondary twist coefficient is less than 2, the convergence of the strand may decrease and the pop-out resistance and the fraying resistance may decrease. When the secondary twist coefficient exceeds 4, the tensile strength and the tensile elastic modulus may decrease.

In the plied twisted cord, lengths of the hard primary twisted yarns (A) and the soft primary twisted yarn (B) when untwisted are adjusted to a specific range by a heat-stretching treatment (heat setting treatment) to be described later. Specifically, when the plied twisted cord is untwisted by 100 mm (the secondary twisted yarns are untwisted) and the primary twisted yarns are aligned, a difference between a length of the soft primary twisted yarn (B) and an average length (arithmetic average value) of the hard primary twisted yarns (A) [treated cord alignment (B–A)] may be in the range of the length of the soft primary twisted yarn (B)—the average length of the hard primary twisted yarns (A)=–1 to 2 mm, and may be, for example, –0.8 mm to 1.5 mm, preferably –0.5 mm to 1 mm, more preferably –0.3 mm to 0.7 mm, more preferably –0.2 mm to 0.5 mm, and most preferably 0 to 0.3 mm. When the treated cord alignment (B–A) is too small, the elongation of the belt may increase. Conversely, when the treated cord alignment (B–A) is too large, the bending fatigue resistance may decrease.

[Method for Producing Core Wire for Power-Transmission Belt]

The core wire for a power-transmission belt according to the present embodiment is obtained through a twisting step of preparing a plied twisted cord formed by putting together and secondary twisting a plurality of primary twisted yarns, and a heat-stretching treatment step of applying tension to the plied twisted cord obtained in the twisting step while heating.

(Twisting Step)

In the twisting step, the primary twisted yarns including a plurality of hard primary twisted yarns (A) and one soft primary twisted yarn (B) are put together and secondary twisted in a direction opposite to the direction of the primary twisting by a common method so as to have the secondary twist coefficient described above.

Each of the primary twisted yarns constituting the primary twisted yarn is also formed by primary twisting by a common method so as to have the primary twist coefficient ratio described above. The twisting directions of each primary twisted yarn including the hard primary twisted yarns (A) and the soft primary twisted yarn (B) may be all the same direction, and the primary twisted yarns are selected to be produced in an S direction or a Z direction depending on a direction of a target core wire.

The twisted cords that have been secondary twisted may be subjected to a, general-purpose adhesion treatment as necessary to bond fibers (filaments) to each other and form an adhesive layer on the cord surface so as to improve the fraying resistance and the adhesiveness to a rubber component. Examples of the general-purpose adhesion treatment include a method of immersing in a treatment liquid containing an epoxy compound or a polyisocyanate compound, a method of immersing in an RFL treatment liquid containing resorcin (R), formaldehyde (F), and latex (L), and a method of immersing in a rubber glue. These treatments may be applied alone or in combination of two or more kinds. In addition to immersion, a method of spraying or coating may be used, but immersion is preferable from the viewpoint of easily permeating the adhesive component to the inside of the cord and easily making the thickness of the adhesive layer uniform.

(Heat-Stretching Treatment Step)

The twisted cord obtained in the twisting step is subjected to a heat-stretching treatment (heat setting) step so as to achieve high tensile strength, small elongation, and high bending fatigue resistance. In the heat-stretching treatment step, by applying heat and tension to the twisted cord, it is possible to improve the compatibility between the filaments (to reduce voids between the filaments), and it is possible to reduce the elongation of the twisted cord, the core wire, and the power-transmission belt. That is, in the power-transmission belt, the elongation of the twisted cord can be removed before the power-transmission belt is formed, and the elongation of the power-transmission belt can be reduced.

Figure 1B:
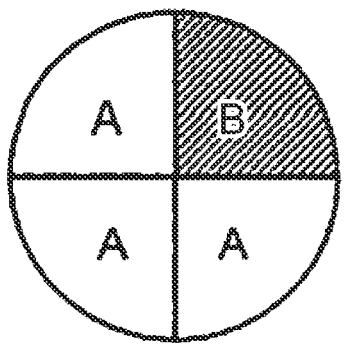
FIG. 1B is a schematic view showing a cross-sectional form of the twisted cord according to the present embodiment after the heat-stretching treatment step.
Figure 1C:
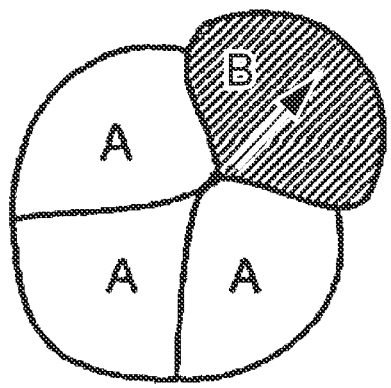
FIG. 1C is a schematic view showing a cross-sectional form of the twisted cord which has been subjected to the heat-stretching under conditions in which a twist coefficient ratio, heat-stretching conditions, and the like are different from those of the present embodiment, after a heat-stretching treatment step.

Furthermore, in the present embodiment, when the twist coefficient ratio of the hard primary twisted yarns (A) and the soft primary twisted yarn (B) is adjusted to a specific range, a twisted cord can be prepared that can achieve both small elongation and high bending fatigue resistance, which are in a trade-off relationship. FIG. 1A to FIG. 1C are schematic views showing cross-sectional forms of a twisted cord before and after the heat-stretching treatment step. FIG. 1A to FIG. 1C show cross-sectional forms of three hard primary twisted yarns (A) (A in FIG. 1A to FIG. 1C) and one soft primary twisted yarn (B) (B in FIG. 1A to FIG. 1C). FIG. 1A shows a form of a twisted cord according to the present embodiment before the heat-stretching treatment step. In FIG. 1A, after twisting, the soft primary twisted yarn (B) is more embedded (recessed) than the hard primary twisted yarns (A) in a direction of a cord inner peripheral (a direction of an arrow in FIG. 1A). FIG. 1B shows a form of the twisted cord according to the present embodiment after the heat-stretching treatment step. After the heat-stretching treatment, the soft primary twisted yarn (B) biting into the cord is moved in an outer circumferential direction, and a twisted yarn cord having a good balance with the hard primary twisted yarns (A) is prepared. Meanwhile, FIG. 1C shows a form of the twisted cord which has been subjected to the heat-stretching under conditions in which the twist coefficient ratio, the heat stretching treatment conditions, and the like are different from those of the present embodiment, after the heat-stretching treatment step. FIG. 1C shows a form in which the soft primary twisted yarn (B) is moved (protruded) in the cord outer circumferential direction (direction of an arrow in FIG. 1C) than the hard primary twisted yarns (A) and the balance is not good, and shows that the twisted cord as a whole has a shape in which the soft primary twisted yarn (B) is wound around the hard primary twisted yarns (A).

Figure 2:
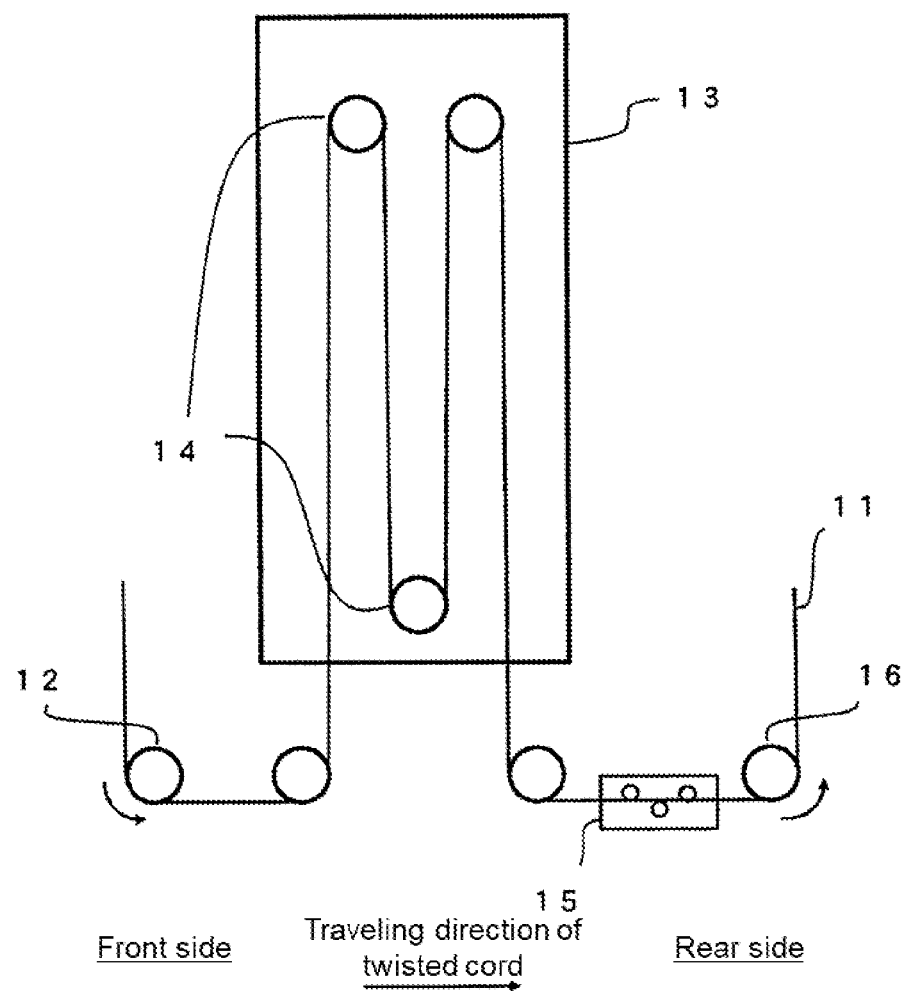
FIG. 2 is a schematic view showing a treatment apparatus used in the heat-stretching treatment step.

FIG. 2 shows a schematic view of a treatment apparatus used in the heat-stretching treatment step. As shown in FIG. 2, the treatment apparatus generally includes a driving roll 12, a heating furnace 13, a folding roll 14, and a driving roll 16. In this treatment apparatus, a twisted cord 11 is wound around each roll, and passes through the heating furnace 13 by the driving force received from the driving roll 12 and the driving roll 16. When a traveling direction of the twisted cord 11 is defined as a rear side and a direction opposite to the traveling direction of the twisted cord 11 is defined as a front side, the driving roll 12 is installed in front of the heating furnace 13, and the driving roll 16 is installed in rear of the heating furnace 13. The folding roll 14 is disposed between the driving roll 12 and the driving roll 16. In the heat-stretching treatment step, tension is applied to the twisted cord 11 by setting the rotation speed of the driving roll 16 to be higher than the rotation speed of the driving roll 12. The tension of the twisted cord 11 may be measured by a tension meter 15 installed at an appropriate position between the driving roll 12 and the driving roll 16, or may be calculated from an axial load applied to the folding roll 14. The tension applied to the twisted cord 11 can be adjusted by feeding back the tension of the twisted cord 11 and controlling the rotation speed of each driving roll. That is, in this treatment apparatus, the twisted cord 11 is subjected to a heat-stretching treatment (heat setting treatment) by passing the twisted cord 11 through a heating furnace set to a predetermined temperature while applying a predetermined tension to the twisted cord 11.

In the heat-stretching treatment step, the tension applied to the twisted cord can be appropriately selected from a range of about 0.1 to 2 cN/dtex according to the twist coefficient of the twisted cord and the like, and is, for example, 0.3 to 1.5 cN/dtex, preferably 0.4 to 1.2 cN/dtex, and more preferably 0.5 to 1 cN/dtex (particularly 0.6 to 0.8 cN/dtex). When the tension is too small, the heat-stretching may be insufficient, and the elongation of the power-transmission belt may increase. Meanwhile, when the tension is too large, the heat-stretching becomes excessive, and the bending fatigue resistance may decrease. When the heat-stretching becomes excessive, for example, the soft primary twisted yarn (B) is moved in the outer circumferential direction of the plied twisted cord, resulting in the form shown in FIG. 1C.

The heating temperature in the heat-stretching treatment step can be appropriately selected from a range of about 150° C. to 250° C. according to the material, twist coefficient, and the like of the fibers forming the twisted cord. The heating temperature is, for example, 160° C. to 240° C., preferably 170° C. to 230° C., and more preferably 180° C.

to 220° C. (particularly 190° C. to 210"C). When the heating temperature is too low, the heat-stretching may be insufficient, and the elongation of the power-transmission belt may increase. Meanwhile, when the healing temperature is too high, the twisted cord (in particular, the soft primary twisted yarn (B)) may be melted or softened.

The twisted cord subjected to the heat-stretching treatment in the heat-stretching treatment step may be further subjected to a coating (overcoat) treatment with a rubber paste, as necessary, so as to improve the adhesiveness to the rubber component.

[Power-Transmission Belt]

Examples of the power-transmission belt according to the present embodiment include a power-transmission belt whose core wire is formed of the above-described core wire, for example, a V-belt such as a wrapped V-belt or a raw edge V-belt, a V-ribbed belt, a flat belt, and a toothed belt. Among these, a V-ribbed belt obtained by molding by a grinding method is preferable.

Figure 3:
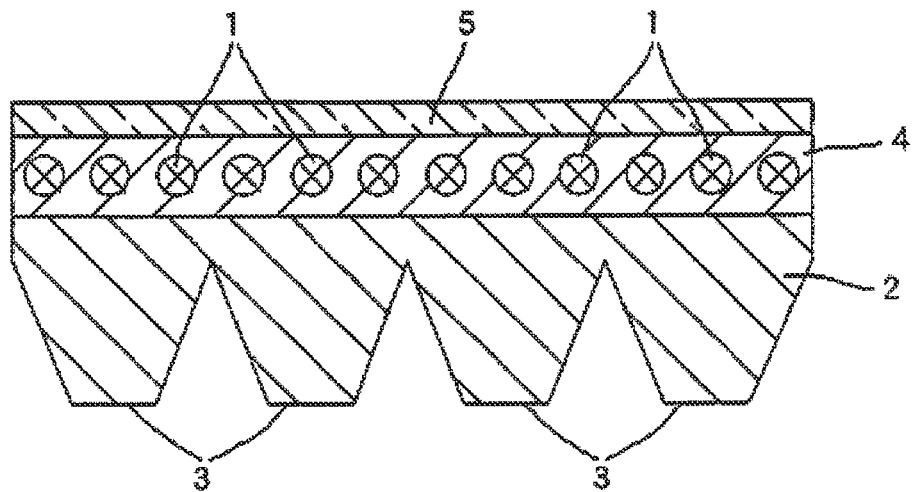
FIG. 3 is a schematic cross-sectional view showing an example of a V-ribbed belt according to the present embodiment.

The form of the power-transmission belt (V-ribbed belt) according to the present embodiment is not particularly limited as long as the power-transmission belt has a plurality of V-rib portions extending parallel to each other along a belt longitudinal direction, and is for example, the form shown in FIG. 3 is exemplified. FIG. 3 is a schematic cross-sectional view showing an example of a V-ribbed belt according to the present embodiment. The V-ribbed belt shown in FIG. 3 has a form in which a compression rubber layer (first rubber layer) 2, an adhesive rubber layer (second rubber layer) 4 in which a core wire 1 is embedded along the belt longitudinal direction, and a tension layer 5 formed of a cover fabric (woven fabric, knitted fabric, nonwoven fabric, etc.) or a rubber composition are laminated in this order from a lower surface (inner peripheral surface) of the belt toward an upper surface (back surface) of the belt. A plurality of sectionally V-shaped grooves extending in the longitudinal direction of the belt are formed in the compression rubber layer 2, A plurality (four in the example shown in FIG. 3) of V-rib portions 3 each having a V-shaped in section ((i.e., inverted trapezoid) are formed between the grooves. Two slopes (i.e., surfaces) of each V-rib portion 3 form a frictional power transmission face, which comes into contact with a pulley to transmit power (i.e., frictional power transmission).

The form of the V-ribbed belt according to the present embodiment is not limited to this form. Any V-ribbed belt can be used as long as it includes a compression rubber layer having a power-transmission face at least a part of which can be in contact a V-rib groove portion (V-groove portion) of a pulley. Generally, the V-ribbed belt may include a tension layer, a compression rubber layer, and core wires embedded therebetween along the longitudinal direction of the belt. In the V-ribbed belt according to the present embodiment, for example, the core wire 1 may be embedded between the tension layer 5 and the compression rubber layer 2 without providing the adhesive rubber layer 4. Further, the V-ribbed belt may have a form in which the adhesive rubber layer 4 may be provided on either the compression rubber layer 2 or the tension layer 5, and the core wire 1 may be embedded between the adhesive rubber layer 4 (compression rubber layer 2 side) and the tension layer 5, or between the adhesive rubber layer 4 (tension layer 5 side) and the compression rubber layer 2.

Any compression rubber layer 2 can be used as long as it includes a rubber composition to be described later in detail, any adhesive rubber layer 4 can be used as long as it includes a rubber composition that is commonly used as an adhesive rubber layer, and any tension layer 5 can be used as long as it includes a cover fabric or a rubber composition that is commonly used as a tension layer. The tension layer 5 does not have to include the same rubber composition as the compression rubber layer 2.

(Core Wire)

The core wires are usually twisted cords arranged at predetermined intervals in a width direction of the belt. The core wires may be embedded in the rubber layer of the power-transmission belt, and in the example described above, the core wires may be disposed extending in the longitudinal direction of the belt in the adhesive rubber layer, and a plurality of core wires parallel to the longitudinal direction may be disposed. However, from the viewpoint of productivity, the core wires are usually disposed in a spiral shape extending in parallel at a predetermined pitch substantially parallel to the longitudinal direction of the belt. When the core wires are arranged in a spiral shape, an angle of the core wire with respect to the longitudinal direction of the belt may be, for example, 5° or less. From the viewpoint of straightness of the belt, the angle is preferable closer to 0°.

An average pitch of the core wires (average distance between centers of the adjacent core wires) can be appropriately selected in accordance with a core wire diameter and a target tensile strength of the belt. The average pitch is, for example, about 0.6 mm to 2 mm, preferably about 0.8 mm to 1.5 mm, and more preferably about 0.9 mm to 1.05 mm. When the average pitch of the core wires is too small, the core wires may run onto each other in the belt manufacturing process. Conversely, when the average pitch is too large, the tensile strength and the tensile elastic modulus of the belt may decrease. The average pitch of the core wires is a value obtained by measuring a distance between centers of adjacent core wires at 10 points in a cross section in the width direction of the V-ribbed belt and averaging the measured distances. A distance between centers of the core wires can be measured using a known device such as a scanning electron microscope (SEM) or a projector.

The core wire may be either S-twisted or Z-twisted, but it is preferable to alternately arrange S-twisted and Z-twisted in order to enhance the straightness of the belt.

(Rubber Composition)

The compression rubber layer, the adhesive rubber layer, and the tension layer may be formed of a rubber composition containing a rubber component. As the rubber component, vulcanized or crosslinkable rubber may be used, and examples thereof include diene rubbers (a natural rubber, an isoprene rubber, a butadiene rubber, a chloroprene rubber, a styrene-butadiene rubber (SBR), an acrylonitrile butadiene rubber (nitrile rubber), a hydrogenated nitrile rubber, etc.), an ethylene-α-olefin elastomer, a chlorosulfonated polyethylene rubber, an alkylated chlorosulfonated polyethylene rubber, an epichlorohydrin rubber, an acrylic rubber, a silicone rubber, a urethane rubber, and a fluorine rubber. These rubber components may be used alone or in combination of two or more kinds.

The ethylene-α-olefin elastomer (ethylene-propylene copolymer (EPM), ethylene-propylene-diene terpolymer (EPDM), etc.) and the chloroprene rubber are preferred rubber components. Further, the ethylene-α-olefin elastomer (ethylene-propylene copolymer (EPM) and the ethylene-propylene-diene terpolymer (EPDM), etc.) is particularly preferred in view of having ozone resistance, heat resistance, cold resistance and weather resistance and reducing the weight of the belt. When the rubber component contains the ethylene-α-olefin elastomer, the proportion of the ethylene-α-olefin elastomer in the rubber component may be 50 mass % or more (particularly about 80 to 100 mass %), and is particularly preferably 100 mass % (only the ethylene-α-olefin elastomer).

The rubber composition may further contain short fibers. Examples of the short fibers include all the fibers shown as the fibers contained in the primary twisted yarn forming the twisted cord of the core wire. The short fibers formed of the fibers described above may be used alone or in combination of two or more kinds. In order to improve dispersibility and adhesiveness in the rubber composition, the short fibers may be subjected to a common adhesion treatment (or surface treatment) as in the case of the core wire. An average length of the short fibers may be, for example, about 0.1 mm to 20 mm, preferably about 0.5 mm to 15 mm (e.g., about 1 mm to 10 mm), and more preferably about 1.5 mm to 5 mm (particularly about 2 mm to 4 mm). The short fiber is oriented in the width direction of the belt in the compression rubber layer, which largely receives lateral pressure and frictional force from the pulley, so that lateral pressure resistance can be secured in the V-ribbed belt. An average fiber diameter of the short fibers is, for example, about 1 μm to 100 μm, preferably about 3 μm to 50 μm, and more preferably about 5 μm to 40 μm (particularly about 10 μm to 30 μm).

The rubber composition may further include additives used commonly. Examples of the additives used commonly include a vulcanizing agent or a cross-linking agent (or a cross-linking agent based additive) (a sulfur-based vulcanizing agent, etc.), a co-cross-linking agent (bismaleimides, etc.), a vulcanization aid or a vulcanization accelerator (a thiuram-based accelerator, etc.), a vulcanization retarder, a metal oxide (zinc oxide, magnesium oxide, calcium oxide, barium oxide, iron oxide, copper oxide, titanium oxide, aluminum oxide, etc.), a reinforcing agent (e.g., carbon black, or silicon oxide such as hydrous silica), a filler (clay, calcium carbonate, talc, mica, etc.), a softener (e.g., oils such as paraffin oil and naphthenic oil), a processing agent or a processing aid (stearic acid, metal stearate, wax, paraffin, fatty acid amide, etc), an anti-aging agent (an antioxidant, an anti-heat aging agent, a bending-crack inhibitor, an ozone-deterioration inhibitor, etc.), a coloring agent, a tackifier, a plasticizer, a coupling agent (a silane coupling agent, etc.), a stabilizer (an ultraviolet absorber, a heat stabilizer, etc.), a flame retardant, and an antistatic agent. These additives may be used alone or in combination of two or more kinds. The metal oxide may act as a crosslinking agent. In particular, the rubber composition constituting the adhesive rubber layer may contain an adhesion improver resorcin-formaldehyde co-condensate, amino resin, etc.).

The rubber compositions constituting the compression rubber layer, the adhesive rubber layer, and the tension layer may be the same as or different from each other. Similarly, the short fibers contained in the compression rubber layer, the adhesive rubber layer, and the tension layer may be the same as or different from each other.

(Cover Fabric)

The tension layer may be formed of a cover fabric. The cover fabric can be formed of for example, a fabric material such as a woven fabric, a wide angle canvas, a knitted fabric, or a nonwoven fabric (preferably, a woven fabric). If necessary, an adhesion treatment such as a treatment with an RFL treatment liquid (such as immersion treatment) or friction for rubbing adhesive rubber into the fabric material may be performed, or the adhesion rubber and the fabric material are laminated (coated) on each other and then laminated on the compression rubber layer and/or the adhesive rubber layer in the above form.

[Method for Producing Power-Transmission Belt]

As a method for producing the power-transmission belt according to the present invention, a method for producing a power-transmission belt, which is commonly used, can be used as long as the core wire described above is used. It is preferable to use a method for use in a producing method that does not require elongation in the forming process. For example, a producing method that includes a grinding step to produce a power-transmission belt by forming with a grinding method is preferable. In particular, when the V-ribbed belt is produced by a mold forming method, the elongation of the twisted cord is removed because the cord is elongated during the forming process, but when the V-ribbed belt is produced by a grinding method, the elongation of the twisted cord cannot be removed. Therefore, a core wire that contains a low elastic modulus fiber but has a small elongation is required, and the core wire according to the present embodiment can be suitably used.

For example, the V-ribbed belt can be formed in the following manner. That is, a compression rubber layer, an adhesive rubber layer in which a core wire is embedded, and a tension layer are formed from unvulcanized rubber compositions (a cover fabric precursor when the tension layer is a cover fabric) respectively, and stacked on one another. A thus-formed laminate is formed into a cylindrical shape by a shaping mold, and vulcanized to form a sleeve. The vulcanized sleeve is cut into a predetermined width, and thus the V-ribbed belt is formed.

More specifically, first, a sheet for a tension layer is wound on a cylindrical forming mold (mold or forming mold) having a smooth surface. A core wire (twisted cord) for forming a tension member is spun spirally on the sheet. Further, a sheet for an adhesive rubber layer and a sheet for a compression rubber layer are wound sequentially to produce a molded body. Thereafter, the forming mold in a state where the molded body is covered with a vulcanizing jacket is put into a vulcanizer to perform vulcanization under predetermined vulcanizing conditions. Then, the molded body is released from the forming mold to obtain a cylindrical vulcanized rubber sleeve. The external surface (i.e., compression rubber layer) of the vulcanized rubber sleeve is ground by a grinding wheel to form a plurality of ribs. The vulcanized rubber sleeve is then cut in the belt longitudinal direction with a predetermined width by a cutter to thereby obtain a V-ribbed belt. The belt cut thus is reversed, and thus a V-ribbed belt including a compression rubber layer having rib portions in an inner peripheral surface thereof is obtained.

In this method, the tension for spinning the core wire (core wire spinning tension) is, for example, 0.3 to 1.5 cN/dtex, preferably 0.4 to 1.2 cN/dtex, and more preferably 0.5 to 1 cN/dtex (particularly 0.6 to 0.8 cN/dtex). When the core wire spinning tension is too low, the stability of the core wire alignment may decrease. When the core wire spinning tension is too high, the tensile strength of the belt may decrease.

EXAMPLE

Hereinafter, the present invention is described in more detail based on Examples, but the present invention is not limited to these Examples. Details of the materials used in the examples are shown below

[Aramid Fiber]

Standard type: "Twaron 1014" manufactured by Teijin Ltd., intermediate elongation 0.6%, tensile elastic modulus 80 GPa High elongation type: "Twaron 2100" manufactured by Teijin Ltd., intermediate elongation 1.0%, tensile elastic modulus 60 GPa

[Low Elastic Modulus Fiber]

"TETRON 1100T-360-704M" manufactured by Toray Industries, Inc., high modulus low shrinkage type polyethylene terephthalate

[Rubber Composition]

Components shown below were mixed at proportions shown in Table 1 to prepare a composition for an adhesive rubber layer. The components shown below were mixed at proportions shown in Table 2 to prepare a composition for a compression rubber layer.

EPDM: "Nodel IP3640" manufactured by Dow Chemical Co.

Zinc oxide: "Zinc Oxide second grade" manufactured by Seido Chemical Industry Co., Ltd.

Stearic acid: "stearic acid beads Tsubaki" manufactured by NOF Corporation

Antioxidant: "Nonflex OD3" manufactured by Seiko Chemical Co., Ltd.

Carbon black HAF: "Seast 3" manufactured by Tokai Carbon Co., Ltd.

Hydrous silica: "Nipsil VN3" manufactured by Tosoh Silica Corporation

Sulfur: manufactured by Miwon Chemicals Co., Ltd.

Nylon short fiber: "Leona" manufactured by Asahi Kasei Co., average fiber diameter: 27 μm, average fiber length: 3 mm Paraffin oil: "Diana Process Oil" manufactured by Idemitsu Kosan Co., Ltd.

Organic peroxide: "Percadox 14" manufactured by Nulion Corporation

TABLE 1

| Composition for adhesive rubber layer | |
| --- | --- |
| Constituent component | Part by mass |
| EPDM | 100 |
| Zinc oxide | 5 |
| Stearic acid | 1 |
| Antioxidant | 1 |
| Carbon black HAF | 40 |
| Hydrous silica | 20 |
| Sulfur | 1 |
| Dibenzothiazyldisulfide | 2 |
| Hexamethoxymethylolmelamine | 2 |
| Total | 172 |

TABLE 2

| Composition for compression rubber layer | |
| --- | --- |
| Constituent component | Part by mass |
| EPDM | 100 |
| Nylon short fiber | 40 |
| Zinc oxide | 5 |
| Stearic acid | 1 |
| Carbon black HAF | 60 |
| Paraffin oil | 10 |
| Organic peroxide | 2 |
| m-phenylene bismaleimide | 2 |
| 2-mercaptobenzimidazole | 2 |
| Total | 222 |

[Cover Fabric]

A woven fabric of a blended yarn of polyester fibers and cotton (polyester fibers/cotton=50/50 mass ratio) (120° wide angle weave, fineness: 20 warp yarns and 20 weft yarns, yarn density of warp yarns and weft yarns: 75 yarns/50 mm, basis weight: 280 g/m²) was immersed in the following RFL treatment liquid and dried to prepare a cover fabric.

[RFL Treatment Liquid]

A solution containing 2.6 parts by mass of resorcin, 1.4 parts by mass of 37 mass % formalin, 17.2 parts by mass of vinylpyridine-styrene-butadiene copolymer latex, and 78.8 parts by mass of water.

Example 1

[Production of Twisted Cord]

As shown in Table 3, three primary twisted yarns, formed by primary twisting a bundle of aramid fibers of 1100 dtex in a. Z direction at a twist coefficient of 4.5, and one primary twisted yarn, formed by primary twisting a bundle of low elastic modulus fibers of 1100 dtex in the Z direction at a twist coefficient of 3.0, were combined and secondary twisted in an S direction at a twist coefficient of 3.2 to prepare a plied twisted cord of S twist. Similarly, a direction of the primary twisting was set to an S direction and a direction of the secondary twisting was set to a Z direction to produce a plied twisted cord of Z twist.

[Inter-fiber Adhesion Treatment to Heat-Stretching Treatment]

The plied twisted cord of S twist and the plied twisted cord of Z twist were immersed in the RFI, treatment liquid (25° C.) for 5 seconds, and then subjected to a heat-stretching treatment to obtain a treated cord of S twist and a treated cord of Z twist. The conditions of the heat-stretching treatment were a temperature of 200° C. (temperature of a heating furnace), a tension (tension applied to the twisted cord) of 0.7 cN/dtex, and a treatment time (time until a certain point of the twisted cord passes through the inside of the heating furnace and reaches the outlet of the heating furnace) of about 1 minute.

[Treated Cord Alignment (B−A)]

1) A distance between chucks of a twisting inspection machine was se to 25 cm, and the treated cord was chucked.

2) The secondary twisting is untwisted, and a length of the shortest primary twisted yarn (yarn linearly extending under tension) was measured. At this time, the primary twisted yarns other than the shortest primary twisted yarn were in a loosened state.

3) The shortest primary twisted yarn (yarn linearly extending under tension) was cut, and the length of the second shortest primary twisted yarn (yarn linearly extending under tension due to cutting of the shortest primary twisted yarn) was measured.

4) Thereafter, the lengths of all the primary twisted yarns were measured in the same manner.

5) An average length (3 or 4 arithmetic average value) of the hard primary twisted yarns (A) was subtracted from the length of the soft primary twisted yarn (B), and the difference is converted into a difference in length per 100 mm.

[Preparation of V-Ribbed Belt]

First, a cover fabric of one ply (one stack) was wound around an outer periphery of a cylindrical forming mold having a smooth surface, and an unvulcanized sheet for an adhesive rubber layer formed of a rubber composition shown in Table 1 was wound around an outside of the cover fabric. Next, the treated cord of S-twist and the treated cord of Z twist were arranged in parallel from above the sheet for an adhesive rubber layer, and were wound by spinning at a tension of 49.0 N (1.1 cN/dtex) in a spiral shape at a core wire pitch (distance between centers of adjacent core wires) of 0.95 mm. Further, the unvulcanized sheet for an adhesive rubber layer, which is formed of the rubber composition shown in Table 1, and the unvulcanized sheet for a compression rubber layer, which is formed of the rubber composition shown in Table 2, were wound in this order thereon. Then, in a state in which a vulcanization jacket was disposed outside the sheet for a compression rubber layer, the forming mold was placed in a vulcanization can, and vulcanized. The cylindrical vulcanized rubber sleeve obtained by vulcanization was removed from the forming mold, and the compression rubber layer of the vulcanized rubber sleeve was ground by a grinder to simultaneously form a plurality of V-shaped grooves. Thereafter, the cylindrical vulcanized rubber sleeve was cut by a cutter so as to be sliced in the circumferential direction, thereby obtaining a V-ribbed belt having three V-rib portions and a circumferential length of 1200 mm (3PK14200, average width 10.7 mm), In the obtained belt, the treated cord of S-twist and the treated cord of Z-twist were alternately arranged in the cross-sectional view in the direction shown in FIG. 3. In addition, the short fibers embedded in the compression rubber protruded from the frictional power transmission surface (the V-shaped side surface of the V-rib portion).

Examples 2 to 11 and Comparative Examples 1 to 4

V-ribbed belts were produced in the same manner as in Example 1 except that a configuration of a twisted cord, conditions of a heat-stretching treatment, a core wire pitch, and a core wire spinning tension were changed as shown in Table 3. In Comparative Examples 1 and 4, three (or four) primary twisted yarns of aramid fibers are combined and secondary twisted, and do not contain low elastic modulus fibers.

[Test Conditions]
[Tensile Strength of Treated Cord and Elongation at Break of Treated Cord]

Tensile strength of treated cord and elongation at break of treated cord were measured according to JIS L1017 (2002). Specifically, a core wire alone (a treated cord subjected to an inter-fiber adhesion treatment and a heat-stretching treatment) was set in a pair of grabbing tools of an autograph so that the core wire was straight without being slackened. The grabbing interval at this time was set to $L_0$ (about 250 mm). Next, one of the grabbing tools was moved at a speed of 300 mm/min to apply a tensile load to the cord, and the tensile load and the grabbing interval were recorded. The tensile strength of the treated cord was determined by dividing the tensile load when the core wire was broken by the fineness of the core wire. The elongation at break of the treated cord was determined by the following formula while regarding the grabbing interval at the time when the core wire was broken as $L_1$ (mm).

Elongation at break of treated cord (%)=$((L_1-L_0)/L_0)\times 100$

[Tensile Strength of Belt]

One V-ribbed belt of 3PK1200 was divided into three equal parts in a longitudinal direction, and three measurement samples each having a rib number of 3 and a length of 400 mm were prepared. This sample was set in a pair of grabbing tools of an Amsler universal tensile tester so that the sample was straight without being slackened. Next, one of the grabbing tools was moved at a speed of 50 mm/min to apply a tensile load to the sample, and the tensile load when the sample was broken was recorded. An arithmetic average of the measured values of the tensile load of the three samples was determined as a tensile strength (N) of the belt.

[Running Test]

Figure 4:
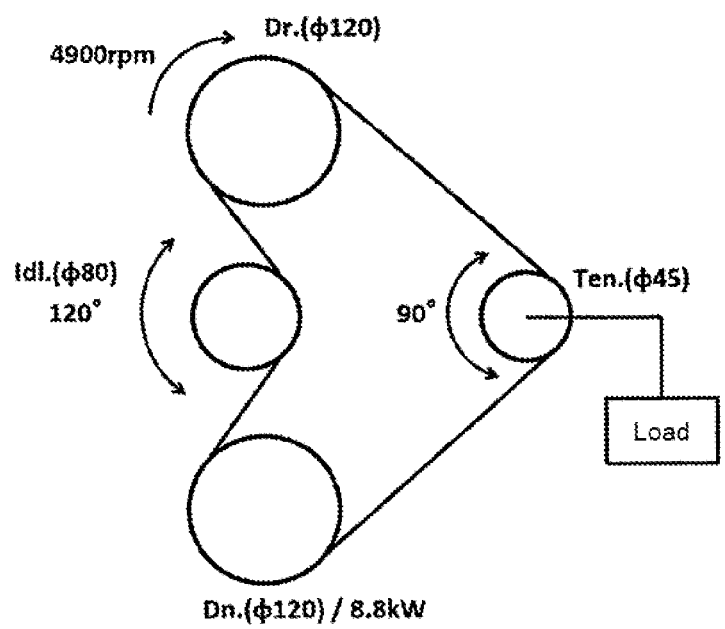
FIG. 4 is a schematic view showing a layout of a running test of an example.

One V-ribbed belt of 3PK1200 was run by a testing machine having a layout shown in FIG. 4, and the durability (BOC change rate and tensile strength retention rate) was evaluated. The testing machine includes a driving pulley (Dr.) having a diameter of 120 mm, a tension pulley (Ten.) having a diameter of 45 mm, a driven pulley (Dn.) having a diameter of 120 mm, and a rear idler (Idl.) having a diameter of 80 mm, A winding angle of the belt around the tension pulley was adjusted to 90°. A winding angle of the belt around the rear idler was adjusted to 120°. A rotational frequency of the driving pulley was set to 4900 rpm. A load of the driven pulley was set to 8.8 kW A tension was applied to the belt by applying an axial load of 810 N to the tension pulley. A test temperature (ambient temperature) was set to 120° C., and running was performed for 100 hours.

[BOC Change Rate]

In a state in which a V-ribbed belt was attached to a running testing machine, an outer circumferential length of the belt before running for 100 hours (BOC (mm) before running) and an outer circumferential length of the belt after running for 100 hours (BOC (mm) after running) were measured with a measuring tape, and a BOC change rate was determined by the following formula. The smaller the BOC change rate is, the smaller the elongation of the V-ribbed belt is.

BOC change rate (%)=$((BOC$ after running$-BOC$ before running$)/BOC$ before running$)\times 100$

[Tensile Strength Retention Rate]

The belt tensile strength of the V-ribbed belt after running for 100 hours was determined in the same manner as described above (belt tensile strength after running (N)). Then, the tensile strength retention rate was determined by the following formula based on the tensile strength (N) of the belt before running. The higher the tensile strength retention rate is, the higher the bending fatigue resistance of the V-ribbed belt is.

Tensile strength retention rate (%)=(Tensile strength of belt after running/Tensile strength of belt before running)×100

The evaluation results of Examples and Comparative Examples are shown in Table 3.

TABLE 3

|  |  | Example | | | | | | | |
|---|---|---|---|---|---|---|---|---|---|
|  |  | 1 | 2 | 3 | 4 | 5 | 6 | 7 | 8 |
| Aramid fiber (A) | Type | Standard | Standard | Standard | Standard | Standard | Standard | Standard | Standard |
|  | Fineness (dtex) | 1100 | 1100 | 1100 | 1100 | 1100 | 1100 | 1100 | 1100 |

TABLE 3-continued

|  |  | | | | | | | | |
|---|---|---|---|---|---|---|---|---|---|
|  | Primary twist coefficient | 4.5 | 45 | 4.5 | 4.5 | 4.5 | 4.5 | 4.5 | 4.5 |
|  | Number | 3 | 3 | 3 | 3 | 3 | 3 | 3 | 3 |
| Low elastic modulus fiber (B) | Fineness (dtex) | 1100 | 1100 | 1100 | 1100 | 1100 | 1100 | 1100 | 1100 |
|  | Primary twist coefficient | 3.0 | 3.0 | 4.5 | 4.5 | 4.5 | 4.5 | 4.5 | 4 5 |
|  | Number | 1 | 1 | 1 | 1 | 1 | 1 | 1 | 1 |
| Ratio (B/A) of primary twist | | 0.67 | 0.67 | 1.00 | 1.00 | 1.00 | 1.00 | 1.00 | 1.00 |
| Secondary twist coefficient | | 3.2 | 3.2 | 3.2 | 3.2 | 3.2 | 3.2 | 3.2 | 3.2 |
| Heat-stretching treatment | Temperature (° C.) | 200 | 200 | 200 | 200 | 170 | 230 | 200 | 200 |
|  | Tension (cN/dtex) | 0.7 | 1.1 | 0.7 | 1.1 | 0.4 | 1.3 | 1.1 | 1.1 |
| Treated cord alignment (B − A) (mm/100 mm) | | −0.6 | −0.2 | −0.3 | 0.7 | −0.9 | 1.4 | 0.7 | 0.7 |
| Tensile Strength of treated cord (cN/dtex) | | 13.6 | 13.6 | 14.1 | 14.5 | 13.3 | 13.8 | 14.5 | 14.5 |
| Elongation at break of treated cord (%) | | 4.2 | 3.7 | 4.1 | 3.7 | 4.6 | 3.3 | 3.7 | 3.7 |
| Core wire pitch (mm) | | 0.95 | 0.95 | 0.95 | 0.95 | 0.95 | 0.95 | 0.95 | 0.95 |
| Core wire spinning tension (N) | | 49.0 | 49.0 | 49.0 | 49.0 | 49.0 | 49.0 | 29.4 | 9.8 |
| Core wire spinning tension (cN/dtex) | | 1.1 | 1.1 | 1.1 | 1.1 | 1.1 | 1.1 | 0.7 | 0.2 |
| Tensile strength of belt (N) | | 6290 | 6490 | 6530 | 6700 | 6150 | 6360 | 6930 | 6830 |
| Running test | BOC change rate (%) | 0.6 | 0.5 | 0.5 | 0.4 | 0.8 | 0.3 | 0.4 | 0.5 |
|  | Tensile strength retention rate (%) | 78 | 79 | 80 | 81 | 74 | 70 | 80 | 81 |

| | | Example | | | Comparative Example | | | |
|---|---|---|---|---|---|---|---|---|
| | | 9 | 10 | 11 | 1 | 2 | 3 | 4 |
| Aramid fiber (A) | Type | Standard | High elongation | High elongation | Standard | Standard | Standard | Standard |
|  | Fineness (dtex) | 1100 | 1100 | 1100 | 1100 | 1100 | 1100 | 1100 |
|  | Primary twist coefficient | 4.0 | 4.0 | 4.5 | 4.5 | 4.5 | 4.5 | 4.5 |
|  | Number | 3 | 3 | 4 | 3 | 3 | 3 | 4 |
| Low elastic modulus fiber (B) | Fineness (dtex) | 1100 | 1100 | 1100 | — | 1100 | 1100 | — |
|  | Primary twist coefficient | 4.0 | 4.0 | 4.5 | — | 1.5 | 6.0 | — |
|  | Number | 1 | 1 | 1 | — | 1 | 1 | — |
| Ratio (B/A) of primary twist | | 1 00 | 1.00 | 1.00 | — | 0.33 | 1.33 | — |
| Secondary twist coefficient | | 2.8 | 2.8 | 3.2 | 3.2 | 3.2 | 3.2 | 3.2 |
| Heat-stretching treatment | Temperature (° C.) | 200 | 200 | 200 | 200 | 200 | 200 | 200 |
|  | Tension (cN/dtex) | 1.1 | 0.9 | 0.9 | 0.9 | 1.1 | 0.7 | 0.9 |
| Treated cord alignment (B − A) (mm/100 mm) | | 0.4 | 0.1 | 0.3 | — | −1.2 | 2.1 | — |
| Tensile Strength of treated cord (cN/dtex) | | 15.5 | 15.7 | 14.4 | 17.6 | 13.1 | 13.5 | 17.0 |
| Elongation at break of treated cord (%) | | 3.6 | 4.0 | 3.9 | 3.8 | 4.5 | 3.8 | 4.0 |
| Core wire pitch (mm) | | 0.95 | 0.95 | 1.05 | 0.90 | 0.95 | 0.95 | 0.95 |
| Core wire spinning tension (N) | | 29.4 | 49.0 | 49.0 | 49.0 | 49.0 | 49.0 | 49.0 |
| Core wire spinning tension (cN/dtex) | | 0.7 | 1.1 | 0.9 | 1.5 | 1.1 | 1.1 | 1.1 |
| Tensile strength of belt (N) | | 7150 | 7250 | 7510 | 6090 | 6070 | 6220 | 7880 |
| Running test | BOC change rate (%) | 0.3 | 0.4 | 0.5 | 0.4 | 1.0 | 0.4 | 0.5 |
|  | Tensile strength retention rate (%) | 70 | 83 | 75 | 67 | 70 | 66 | 57 |

In Comparative Example 1 in which the primary twisted yarn (B) of low elastic modulus fibers was not contained and three primary twisted yarns (A) of aramid fibers were combined and secondary twisted and Comparative Example 4 in which the primary twisted yarn (B) of low elastic modulus fibers was not contained and four primary twisted yarns (A) of aramid fibers were combined and secondary twisted, the bending fatigue resistance was not sufficient and the tensile strength retention rate was low.

Meanwhile, in Examples 1 to 4 in which the primary twisted yarns (A) of aramid fibers and the primary twisted yarn (B) of low elastic modulus fibers were contained and the ratio (B/A) of the primary twist coefficient of the primary twisted yarn (B) of low elastic modulus fibers to the primary twist coefficient of the primary twisted yarns (A) of aramid fibers was within a certain range, both the high tensile strength retention rate and the small elongation of the power-transmission belt were achieved.

From the comparison between Examples 1 to 4 and Comparative Examples 2 to 3, it can be seen that good results are obtained when the ratio (B/A) of the primary twist coefficient of the primary twisted yarn (B) of low elastic modulus fibers to the primary twist coefficient of the primary twisted yarns (A) of aramid fibers is in the range of about 0.5 to 1.2. Similarly, it is considered that the primary twist coefficient of the primary twisted yarn (B) of low elastic modulus fibers is preferably in the range of 2.5 to 5. In Comparative Example 2, since the ratio (B/A) of the primary twist coefficient of the primary twisted yarn (B) of low elastic modulus fibers to the primary twist coefficient of the primary twisted yarns (A) of aramid fibers was as small as 0.33, the belt elongation increased. This is considered to be a result of increasing the degree of freedom in the cross-sectional shape of the primary twisted yarn (B) in the plied twisted cord, in Comparative. Example 3, since the ratio (B/A) of the primary twist coefficient of the primary twisted yarn (B) of lower elastic modulus fibers to the primary twist coefficient of primary twisted yarns (A) of aramid fibers was as large as 1.33, the tensile strength retention ratio was low. It is considered that this is because the elongation of the primary twisted yarn (B) increases and the primary twisted yarn (B) is moved to the periphery of the plied twisted cord, and as a result, the bending fatigue resistance decreases.

From the comparison of Examples 3 to 4 and 10, the tensile strength retention rate was higher when the aramid fiber of the high elongation type was used than when the aramid fiber of the standard type was used. However, even in Examples 3 and 4, both the high tensile strength retention rate and the low elongation of the power-transmission belt were achieved at a sufficient level, and it can be said that the aramid fiber of the high elongation type may be used with priority given to the performance of the power-transmission belt, or the aramid fiber of the standard type may be used with priority given to the price, availability, and the like.

In Examples 7 to 8, the spinning tension of the core wire was lower than that in Example 4, but the tensile strength of the belt was improved. It is presumed that the reason for this is that the belt shrinkage after the vulcanized rubber sleeve is removed from the forming mold is prevented, and the balance between the primary twisted yarn of aramid fibers and the primary twisted yarn of low elastic modulus fibers optimized at the time of heat setting is easily maintained. It can be estimated that when the tension becomes too low, the alignment of the core wires becomes difficult to stabilize.

In Example 9, the primary twist coefficient is smaller than that of Example 7. The tensile strength of the treated cord was improved, but the tensile strength retention rate decreased.

From the comparison between Example 10 and Example 11, it is considered that the number of the primary twisted yarns (A) of aramid fibers is preferably three rather than four. It was considered that the bending fatigue resistance decreased when the number of the primary twisted yarns (A) of aramid fibers was four, and thus the tensile strength retention rate decreased.

In the examples, polyethylene terephthalate fibers were used as the low elastic modulus fibers, but other polyester fibers (e.g., polyethylene naphthalate), aliphatic polyamide fibers (e.g., nylon 66), and the like can also be used. However, when these other fibers were used, the tensile strength and bending fatigue resistance of the power-transmission belt may not be sufficiently improved, and polyethylene terephthalate fibers are considered to be preferable.

From the comparison of Examples 3 to 6, the belt elongation was large in Example 5 in which the heating temperature in the heat-stretching treatment was low. It is considered that this is because, when the heating temperature is low, the filaments in the twisted cord do not sufficiently conform to each other (voids between the filaments do not sufficiently decrease), and the twisted cord is easily elongated. In addition, in Example 6 in which the heating temperature in the heat-stretching treatment was high, the tensile strength retention rate was low. This is considered to be because the effect of improving the bending fatigue resistance was not sufficiently obtained because the heat-stretching became excessive and the primary twisted yarn (B) of low elastic modulus fibers was moved to the periphery of the twisted cord. Therefore, the heating temperature in the heat-stretching treatment is preferably 160° C. to 240° C., and the tension (tension applied to the twisted cord) is preferably 0.3 to 1.5 cN/dtex.

From the comparison between Examples 1 to 11 and Comparative Examples 2 to 3, it can be confirmed that when the treated cord alignment (B–A) is in the range of −1 to 2 mm/100 mm, both the high tensile strength retention rate and the small elongation of the power-transmission belt were achieved.

As described above, the core wire for a power-transmission belt according to the present invention is obtained by mixing and twisting the aramid fibers and the low elastic modulus fibers, so that the elongation of the power-transmission belt can be reduced while maintaining the high tensile strength, and the bending fatigue resistance can be improved. Therefore, the core wire can be suitably used for a V-ribbed belt produced by a grinding method (in particular, a V-ribbed belt which is produced by a grinding method and in which short fibers embedded in a compression rubber protrude from a frictional power transmission surface).

Although the present invention has been described in detail with reference to a specific embodiment, it is obvious to those skilled in the art that various changes and modifications may be made without departing from the gist and the scope of the invention.

This application is based on Japanese Patent Application 2020-005388 filed on Jan. 16, 2020, and Japanese Patent Application 2020-206743 filed on Dec. 14, 2020, contents of which are incorporated by reference herein.

INDUSTRIAL APPLICABILITY

The core wire for a power-transmission belt according to the present invention can be used as a core wire for various power-transmission belts, for example, frictional power-transmission belts such as a flat belt, a wrapped V-belt, a raw edge V-belt, a raw edge cogged V-belt, and a V-ribbed belt; and meshing power-transmission belts such as a toothed belt and a double-sided toothed belt. In particular, the core wire for a power-transmission belt according to the present invention can be suitably used as a core wire of a V-ribbed belt used for driving an auxiliary machine of an automobile engine, and can be particularly suitably used as a core wire of a V-ribbed belt for driving an ISG-equipped engine in which high dynamic tension is generated, because of high tensile strength and excellent durability.

REFERENCE SIGNS LIST

1 Core wire for power-transmission belt
2 Compression rubber layer
3 V-rib portion
4 Adhesive rubber layer
5 Tension layer

The invention claimed is:

1. A core wire for a power-transmission belt, comprising a plied twisted cord formed by putting together and secondary twisting a plurality of primary twisted yarns,
    wherein the primary twisted yarns comprise a plurality of hard primary twisted yarns (A) and one soft primary twisted yarn (B),
    the hard primary twisted yarns (A) comprise an aramid fiber, a fineness of each hard primary twisted yarn (A) is 1500 dtex or less, the soft primary twisted yarn (B) comprises a low elastic modulus fiber, and a ratio (B/A) of a primary twist coefficient of the soft primary twisted yarn (B) to an average value of primary twist coefficients of the hard primary twisted yarns (A) is 0.5 to 1.2, wherein when the plied twisted cord is untwisted by 100 mm and the primary twisted yarns are aligned, a difference (B−A) between a length of the soft primary twisted yarn (B) and an average length of the hard primary twisted yarns (A) satisfies: the length of the soft primary twisted yarn (B)−the average length of the hard primary twisted yarn (A)=−1 mm to 2 mm.

2. The core wire for a power-transmission belt according to claim 1, wherein the fineness of the hard primary twisted yarns (A) is 1000 dtex to 1250 dtex.

3. The core wire for a power-transmission belt according to claim 1, wherein the number of the hard primary twisted yarns (A) is 3 to 4.

4. The core wire for a power-transmission belt according to claim 1, wherein the primary twist coefficient of the soft primary twisted yarn (B) is 2.5 to 5.

5. The core wire for a power-transmission belt according to claim 1, wherein the soft primary twisted yarn (B) comprises a polyester fiber, and a fineness of the soft primary twisted yarn (B) is 900 dtex to 1250 dtex.

6. The core wire for a power-transmission belt according to claim 1, wherein the aramid fiber is a high-elongation aramid fiber.

7. A method for manufacturing a core wire for a power-transmission belt according to claim 1, the method comprising:

putting together and secondary twisting a plurality of primary twisted yarns to prepare a plied twisted cord; and heat-stretching the obtained plied twisted cord by applying tension to the plied twisted cord while heating.

8. The method according to claim 7, wherein in the heat-stretching, a heating temperature is 160° C. to 240° C., and the tension is 0.3 cN/dtex to 1.5 cN/dtex.

9. A power-transmission belt comprising the core wire for a power-transmission belt according to claim 1.

10. The power-transmission belt according to claim 9, wherein the power-transmission belt is obtained by forming by a grinding method.

11. The power-transmission belt according to claim 10, wherein the power-transmission belt is a V-ribbed belt.

12. A method for producing the power-transmission belt according to claim 10, the method comprising forming a power-transmission belt by a grinding method.

* * * * *